United States Patent [19]
Schmidt et al.

[11] Patent Number: 5,991,807
[45] Date of Patent: *Nov. 23, 1999

[54] SYSTEM FOR CONTROLLING USERS ACCESS TO A DISTRIBUTIVE NETWORK IN ACCORDANCE WITH CONSTRAINTS PRESENT IN COMMON ACCESS DISTRIBUTIVE NETWORK INTERFACE SEPARATE FROM A SERVER

[75] Inventors: Jonathan Schmidt; Lewis Donzis; Henry Donzis; John Murphy; Peter Baron; Herb Savage, all of San Antonio, Tex.

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/669,053

[22] Filed: Jun. 24, 1996

[51] Int. Cl.$^6$ ............................................. G06F 13/00
[52] U.S. Cl. ........................... 709/225; 713/200; 713/201
[58] Field of Search ........................... 340/825.31; 707/9; 380/25; 709/225; 713/200, 201

[56] References Cited

U.S. PATENT DOCUMENTS

| | | | |
|---|---|---|---|
| 5,276,901 | 1/1994 | Howell et al. ............................... | 707/9 |
| 5,315,657 | 5/1994 | Abadi et al. ............................... | 380/25 |
| 5,321,841 | 6/1994 | East et al. ............................... | 395/677 |
| 5,483,596 | 1/1996 | Rosenow et al. ......................... | 380/25 |
| 5,552,776 | 9/1996 | Wade et al. ........................ | 340/825.31 |
| 5,655,077 | 8/1997 | Jones et al. ........................ | 395/187.01 |
| 5,671,354 | 9/1997 | Ito et al. ............................ | 395/187.01 |
| 5,675,782 | 10/1997 | Montague et al. ................. | 395/187.01 |
| 5,678,041 | 10/1997 | Baker et al. ....................... | 395/188.01 |

*Primary Examiner*—Le Hien Luu
*Attorney, Agent, or Firm*—Blakely Sokoloff; Taylor & Zafman LLP

[57] ABSTRACT

A method of managing access to a distributive network provides both time and site access restraints for users or groups of users on a LAN or WAN adapted for accessing the network through a common network access interface system. The method utilizes the LAN server to develop and monitor the constraints, minimizing the utilization of the access interface system. The management parameters for each group or individual having access to the distributive network via the LAN or WAN is entered into the interface box by the administrator as a compact reference, a series of pointers to the larger database of users and groups stored in the existing LAN server directory services. The existing database of users and groups and their relationships exist already in the LAN servers as a normal consequence of LAN operation and a simple, graphical user interface in the preferred embodiment of the invention permits familiar selection of objects of that database and assignment of access constraints.

29 Claims, 5 Drawing Sheets

```
                    ┌─100 ┌─102 ┌─104  ┌─106      ┌─108
         110          ▼     ▼    ▼      ▼          ▼
            ┌──▶"06/19/96 14:06:42","2","HERB     ","Start","00C058007CD4"
            ┌──▶"06/19/96 14:07:24","2","HERB     ","Connect Socket:2001 altavista.digital.com:www"
         112 ┌─▶"06/19/96 14:07:58","2","HERB     ","Connect Socket:2001 infosrvl.ctd.ornl.gov:www"
            ┌──▶"06/19/96 14:14:01","3","ROD      ","Start","008029835B27"
         114   "06/19/96 14:14:03","3","ROD      ","Connect Socket:2001 gw.perftech.com.www"
            ┌──▶"06/19/96 14:14:49","2","HERB     ","Connect Socket:2001 altavista.digital.com:www"
         116   "06/19/96 14:15:00","3","ROD      ","Connect Socket:2002 199.81.92.10:www"
               "06/19/96 14:15:12","2","HERB     ","Connect Socket:2003 www.pwrquest.com:www"
               "06/19/96 14:18:09","2","HERB     ","Connect Socket:2001 altavista.digital.com:www"
            ┌──▶"06/19/96 14:19:15","3","ROD      ","End"
         118   "06/19/96 14:19:28","2","HERB     ","Connect Socket:2001 dec2000.faf.cuni.cz:www"
            ┌──▶"06/19/96 14:19:42","4","ROD      ","Start","008029835B27"
         120   "06/19/96 14:19:42","4","ROD      ","Connect Socket:2002 134.177.1.103:telnet"
               "06/19/96 14:20:18","5","ANDY     ","Start","00C0F000EA24"
               "06/19/96 14:20:20","5","ANDY     ","Connect Socket:2003 www.us.msn.com:www"
               "06/19/96 14:20:26","5","ANDY     ","End"
               "06/19/96 14:20:34","6","ANDY     ","Start","00C0F000EA24"
               "06/19/96 14:20:45","2","HERB     ","Connect Socket:2003 hpux.nis.za:www"
               "06/19/96 14:20:49","6","ANDY     ","Connect Socket:2003 phydeax.xircom:ftp"
               "06/19/96 14:21:04","2","HERB     ","Connect Socket:2004 WWW.TECHARCHITECTS.COM:www"
               "06/19/96 14:21:34","2","HERB     ","Connect Socket:2004 altavista.digital.com:www"
               "06/19/96 14:22:10","2","HERB     ","Connect Socket:2004 205.233.69.111:www"
               "06/19/96 14:22:39","2","HERB     ","Connect Socket:2001 www.software.hosting.ibm.com:www"
               "06/19/96 14:23:02","2","HERB     ","Connect Socket:2001 altavista.digital.com:www"
               "06/19/96 14:23:07","2","HERB     ","Connect Socket:2001 www.pwrquest.com:www"
               "06/19/96 14:24:20","2","HERB     ","End"
               "06/19/96 14:24:58","6","ANDY     ","End"
               "06/19/96 14:33:03","4","ROD      ","End"
               "06/19/96 14:38:31","25","ROD     ","Start","008029835B27"
               "06/19/96 14:40:38","25","ROD     ","End"
               "06/19/96 14:43:35","26","Thomas  ","Start","00C0F000F759"
               "06/19/96 14:43:46","26","Thomas  ","Connect Socket:2001 www.us.msn.com:www"
               "06/19/96 14:44:03","26","Thomas  ","Connect Socket:2001 www.eudora.com:www"
               "06/19/96 14:44:04","26","Thomas  ","Connect Socket:2004 www.rohan.qualcomm.com:www"
               "06/19/96 14:52:22","27","JON     ","Start","0040332011C8"
               "06/19/96 14:52:25","27","JON     ","Connect Socket:2004 Mercury.secapl.com.www"
               "06/19/96 14:52:32","27","JON     ","Connect Socket:2004 Farstar.secapl.com.www"
               "06/19/96 15:02:10","28","thomas  ","Start","00A02496144F"
               "06/19/96 15:02:10","28","thomas  ","Connect Socket:2004 ibm32.perrtech.com:nntp"
               "06/19/96 15:02:32","27","JON     ","End"
               "06/19/96 15:02:41","29","Thomas  ","Start","00A02496144F"
               "06/19/96 15:02:52","29","Thomas  ","End"
               "06/19/96 15:03:02","30","Thomas  ","Start","00A02496144F"
               "06/19/96 15:03:05","30","Thomas  ","End"
               "06/19/96 15:13:01","31","RANDY   ","Start","00403320140C"
```

FIG. 8

SYSTEM FOR CONTROLLING USERS ACCESS TO A DISTRIBUTIVE NETWORK IN ACCORDANCE WITH CONSTRAINTS PRESENT IN COMMON ACCESS DISTRIBUTIVE NETWORK INTERFACE SEPARATE FROM A SERVER

BACKGROUND OF INVENTION

1. Field of Invention

The subject invention is generally related to access systems for connecting the users on a LAN or WAN to a distributive network such as, by way of example, corporate intranets and the Internet, and is specifically directed to a method for managing and controlling access to the network under both time and category constraints.

2. Description of the Prior Art

Distributive networks such as, by way of example, the Internet, for interconnecting computers are well known. Such networks permit remote and distributed computers to communicate with each other over public communication channels. Over the years, use of such networks for research and for communication via E-mail, file transfer, interactive World Wide Web browsing and the like has become widespread. As such use has become commonplace in the work environment, individual users and user groups have access to the world wide web via their workstation PC's. While greatly facilitating the capability of each worker at a PC workstation, such access has greatly complicated management of the worker. Systems to control both site and time access to the web have become essential management tools to assure that only authorized users are interacting with facilities over the Internet during authorized time periods for legitimate, authorized purposes.

Numerous policing techniques have been attempted in the past, but all require burdensome administrative procedures and lack the fine ability to discriminate between legitimate and undesirable use and are, in addition, implemented on additional hardware which carries significant expense. Management and control of user access to the Internet has been traditionally implemented as an outgrowth of firewall technology. Firewall technology involves a hardware device placed between the LAN which is supporting the workstations and computers and the Internet. The purpose of a firewall is to prevent outside, that is, other Internet computers and workstations, from gaining access to and damaging or capturing control of the internal LAN computers and their data. As access to the Internet from within the LAN expanded to the general employee population and their workstations from the previously well-controlled group of computer specialists, the management of the access to the Internet became an additional requirement.

The technology of the firewall to control access between computers within and without the local LAN is through the use of Internet addressing, IP addresses are normally required of every computer connected to the Internet. Tables are established of internal and external computer addresses both individually and in contiguous groups, domains, and permissions are assigned to the allowed connectivity. The complexity becomes much greater as the expanded utility of the Internet requires the identification of users as well as services at the various computers and permissions more finely identified even within addresses.

Firewall technology is built upon the perspective of the traditional computers used to build and operate the Internet, UNIX-based processors. These processors network together with the very protocols used by the Internet, TCP/IP and the firewalls are designed to negotiate the management of the Internet IP addressing both within and without.

The rapid dissemination of access to the Internet has brought the requirements to networks consisting only of PCs typically running only PC operating systems such as WINDOWS, WINDOWS-95, and NT. These are single user workstations and which have, themselves, a completely separate database of users and groups designed for access within the network, the LAN, itself, to the PC LAN's own resources such as local file access and printer access. These LANs were designed without knowledge of and without preparation for interfacing with the Internet. In fact, they operate normally on protocols which are incompatible with and have no addressing for Internet interfacing.

The prior art extends Internet IP addressing as an additional network interface addressing each of the LAN PC workstations and treating the Internet-address-enhanced PCs as if they were traditional host UNIX networked computers, with firewall techniques managing the Internet interface.

Therefore, a need for a reliable, versatile administration system for controlling and monitoring access to distributive network sites by either individual or groups of PC users on a LAN or WAN within the capabilities of the administration capacity of the personnel normally managing the original mechanisms and purposes for which it was designed and to do so with the management architecture already established.

SUMMARY OF THE INVENTION

The subject invention is directed to a method for easily controlling access to a distributive network by an individual user or groups of users both with respect to site address and services to be accessed and to the time periods when access is authorized from within the already established user management database originally established to control the original purpose of the LAN.

The method of the subject invention permits administration of the use of the distributive network by providing management with the tools to not only define and control authorized use, but also to maintain a complete access log to determine actual usage by each user on a LAN or WAN based upon the existing LAN management architecture.

The preferred embodiment of the subject invention utilizes an access interface system or box associated with the distributive network, whereby access to the distributive network by each of the plurality of PCs on the LAN or WAN is through the common access box without requiring the additional Internet IP addressing to be added to each LAN PC. This permits the box to identify the individual user or the user group through the native identification of the LAN and to implement the administration system.

A significant advantage of the system of the subject invention is that the management parameters for each group or individual having access to the distributive network via the LAN or WAN is entered into the box by the administrator as a compact reference, a series of pointers to the larger database of users and groups stored in the existing LAN server directory services. The existing database of users and groups and their relationships exist already in the LAN servers as a normal consequence of LAN operation and a simple, graphical user interface in the preferred embodiment of the invention permits familiar selection of objects of that database and assignment of Internet access constraints.

Furthermore, the processing of the access control is undertaken by the individual LAN PC, itself, after first verifying its identity through the LAN PC authenticating itself against the native LAN login and authentication. The individual PC, after the authentication of its identity by the normal LAN mechanisms, accesses the access control parameters assigned to that user or group from the box where it has been stored and the special box access module, itself, screens and controls Internet access for that PC user and updates the log files and metering parameters by updating those pieces of information stored in a secure place in the box.

Therefore, capacity is not limited since the capacity for identification of groups and/or individuals is maintained in the normal LAN directory management and the control overhead of these users and groups expands with the addition of PCs on the LAN or WAN, each controlling its own access constraints and updating the log of its own access events.

One example of an access product having the capability of providing common access to a distributive network and through which managed access may be implemented is the Instant Internet system offered by Performance Technology, Inc., San Antonio, Tex. The Instant Internet product is specifically designed for PC networks and enables all LAN users to simultaneously access a distributive network such as a corporate intranet, the Internet, or both, through a common interface or box. The box is an ideal location to be the focus of the monitor and control use by each user on the LAN.

In the preferred embodiment of the subject invention, the administration system is capable of utilizing the native LAN identification of users, the group or groups to which each user is defined, and for authorizing for each user so identified the specific Internet destinations and services to which the user has access and the time and day during which the access is authorized. For example, if user PC LAN user A is assigned to the PC LAN group 1, user A will have access to Internet destinations and services for which group 1 has authorization. Further, the time to which access is allowed is controlled. For example, user A may have access to only limited addresses during the hours of 9:00 a.m. to 12:00 a.m. and 1:00 p.m. to 5:00 p.m., with unlimited access from 7:00 a.m. to 9:00 a.m. and 5:00 p.m. to 7:00 p.m. and no access at all from 7:00 p.m. to midnight and from midnight to 7:00 a.m. This can be accomplished simply by assigning group parameters at a PC workstation on the LAN as Group 1 parameters.

In the preferred embodiment, the group access constraint parameters are stored at the access box. The PC, itself, using the authentication mechanism inherent in the relationship between the PC and the network's native security system, identifies itself as user A and as a member of Group 1 to the module installed in the PC which is designed to provide Internet access through the box. Upon each attempted access to an Internet site and/or service, the access module in the box authenticates the permission of user A/group 1 to that site/service by reading the constraints associated with user A/group 1 from the reference pointers stored in the box for user A/group 1.

It is an important feature of the subject invention that the administration system includes a method for maintaining a log of each user's actual access and use of various destinations and services on the Internet. For example, user A may browse an authorized library of files from 9:00 to 9:15 and then access an authorized news service from 11:02 to 11:27. User A may also access an entertainment program from 12:00 noon to 1:00 p.m. The method of the subject invention will provide a management log identifying each user and the specific sites addressed and utilized. This provides a management tool for determining efficient and appropriate use of the distributive network during working hours and at employer expense. It is also of value for cost analysis purposes for specific projects to which the user is assigned.

In the preferred embodiment, when the administration system is installed on the LAN or WAN, all network users default to unlimited access. Where access is not required to be limited, the LAN or WAN operates as if the administration system is not present and will not interfere with the normal operation of each user. The logging function is active for management auditing of the actual user of the distributive network accessing system. The method of the preferred embodiment allows access to be assigned on a user or group basis, where desired. Users in a group will have access to a particular set of network resources. Whenever access is changed for the group, access for every user in the group is simultaneously changed. A user may be a member of several groups, with each group assigned different access parameters. In this case, the system defaults the user to the combined access restrictive of all of the group memberships.

The preferred embodiment of the invention is Windows compatible with a point-and-click methodology used to define groups, users and authorized parameters. Users may be assigned to one or more groups and moved from group to group using the point-and-click method. Parameters may be initially assigned or altered for each group using a single screen access, permitting simple implementation of the administration system with a minimum of training.

In the preferred embodiment, the constraints to Internet destinations and services utilize a unique allow/disallow wild-card specification of the destinations and services to be accessed. This mechanism permits broad freedom of access to acceptable destinations and services and easy specification of those unacceptable. The specification "wild card" entries are identified as stars, *, and can be entered at any point in an Internet destination either in text domain name (i.e. *.microsoft.com) or in numeric specification (i.e. 144.228.*.*), in services (WWW or FTP or *) and even in newsgroups (*.sex.* which identifies access to any newsgroup with the intermediate specifier SEX anywhere in the hierarchical specification name). The specifications with or without wild card stars may be identified as ALLOW or DISALLOW statements and are intended to be used together to forge a comprehensive yet easily specifiable constraint system.

Also in the preferred embodiment, each user or group is identified as an icon, with each group being depicted as a folder and each user depicted as a figure. To add or change user access, a folder is selected and the "Change" box provided on the toolbar is clicked to bring up the Setting window, displaying the user or group parameters. The administrator can then disable or enable a user or group, change access, or change time of access.

The subject invention provides a wide administrative function for controlling and managing access to distributive networks by individual users or users assigned to a group on a LAN or WAN system. This greatly increases the efficiency of the workplace and minimizes unauthorized use, reducing non-productive time and the access costs associated therewith.

It is, therefore, an object and feature of the subject invention to provide a method of administration of distributive network use by a user on a LAN or WAN.

It is also an object and feature of the subject invention to provide a method for controlling the authorized destinations and services and the authorized time and day of access to a distributive network by each user/group on a LAN or WAN.

It is a further object and feature to provide a log of users and sites accessed on a distributive network by each user on a LAN or WAN.

It is yet another object and feature of the invention to utilize the memory and processing power of each of the PCs on the LAN or WAN to authenticate the user/group identity through the native LAN login name/password authentication system. The management system is, thereby, expandable with the LAN or WAN and does not rely on the single network access system device to form the capacity.

Other objects and features of the invention will be readily apparent from the accompanying drawings and description.

BRIEF DESCRIPTION OF THE DRAWINGS

FIG. 8 is a typical printed log report.

DETAILED DESCRIPTION OF THE PREFERRED EMBODIMENT

Figure 1:
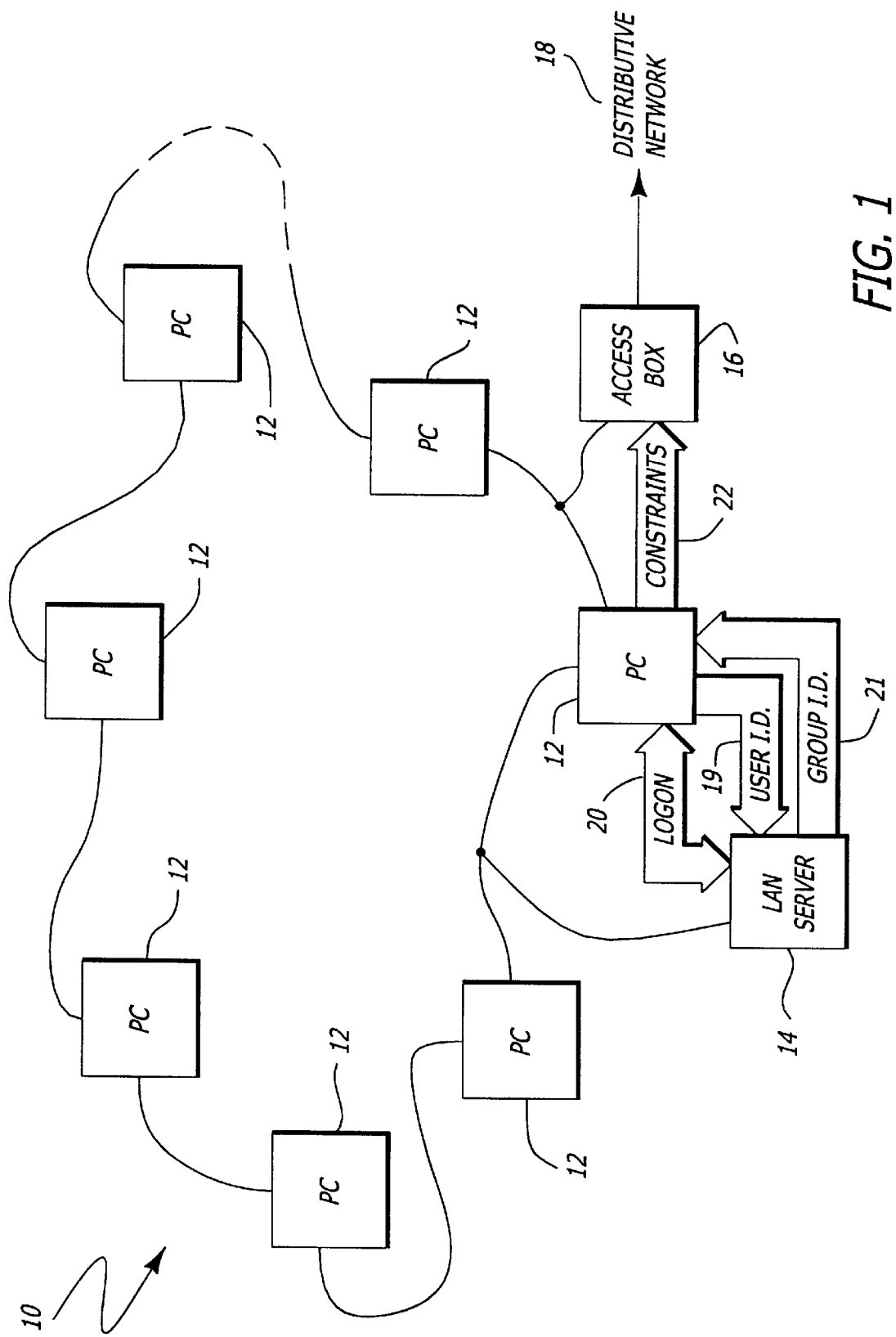
FIG. 1 is a flow chart showing a system diagram incorporating the features of the subject invention.

A typical network system adapted for incorporating the administration system and method of the subject invention is shown in FIG. 1. A local access network or LAN 10 includes a plurality of workstation PCs 12, a network server 14 such as, by way of example a Novell server, and a distributive network access interface or box 16 such as, by way of example an Instant Internet access system. The network access interface box 16 permits each PC on the LAN to connect to a distributive network 18, such as, by way of example the Internet. In the preferred embodiment of the invention, the software for managing the administration system is installed in the server 14. This stores the information defining each individual user and the groups available for user assignment. The group constraints may be customized on site and on demand, with users being capable of being assigned to any of one or more groups at any time by the authorized administrator. All of this information is stored and manipulated at the server location, minimizing the use of access box memory capacity. This permits ready expansion of the administration system without requiring upgrade of the access box 16. That is, the administration system is capable of supporting the number of users and PCs supported by the server 10 and is not dependent upon the capacity of the access box 16.

As shown by the information flow arrows in FIG. 1, a typical user "logs on" to the network 10 in the well known manner by entering his I.D. or password to the server 14 from any one of the plurality of PCs 12 on the LAN network, as indicated by the arrow 19. The server 14 then grants LAN access by properly identifying and authenticating the user, as indicated by the double arrow 20. The server also identifies what group the user is assigned to, as indicated by the arrow 21. Only the constraints for this group I.D. are then entered at the access box 16, as indicated by the arrow 22. As also indicated by the arrow 22, the administrator provides the access box with constraints for each group when stationed at any PC having properly authenticated himself to the box as the box administrator by name and password. When the user desires to access the distributive network 18 via the access box 16, his group is identified and the constraints assigned to the group are implemented, controlling access within both destination and service parameters as well as time parameters.

Using a Novell server and an Instant Internet access system as an example, the Instant Internet system uses the NetWare user names and groups. Each of the users assigned to a group have access to a particular set of distributive network resources. When resource access is changed for the group, access for every user in the group is simultaneously changed. A group may have as many users as desired or as few as one user to be active. A user may be a member of several groups, with each group assigned different access parameters. In the preferred embodiment, the user only has access to the parameters of the most restrictive group to which he is assigned. Also in the preferred embodiment, any individual user may be exempted from all user and group constraints and specific individual constraints may be applied.

Figure 2:
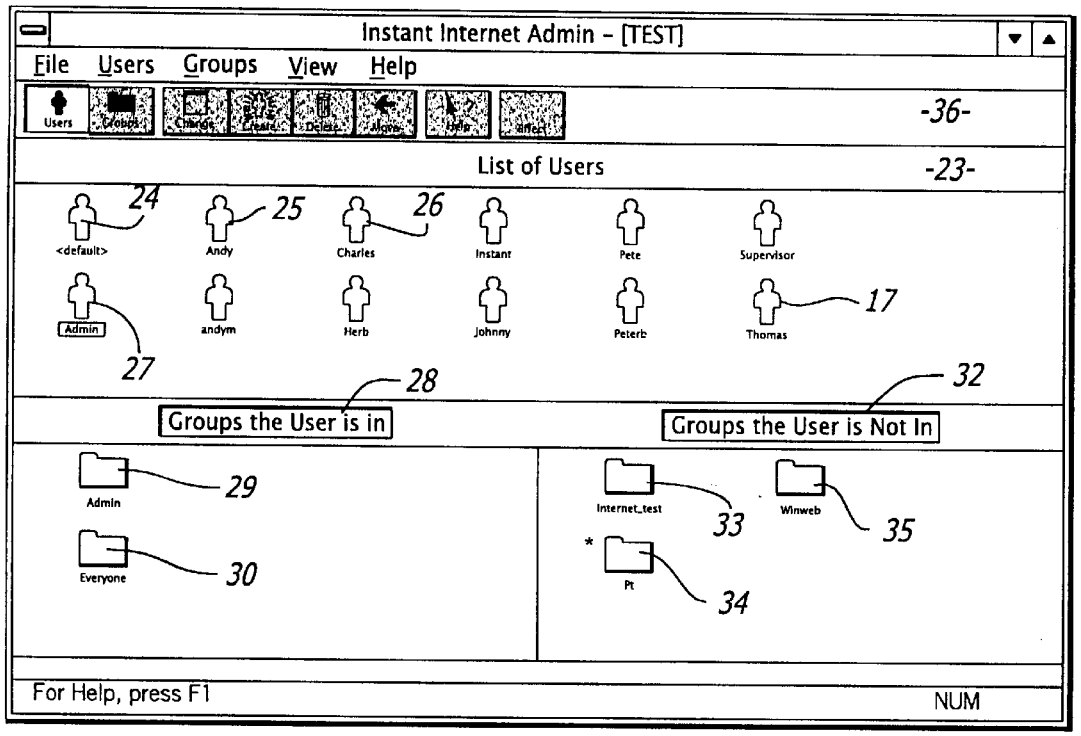
FIG. 2 is a representative screen showing the user and group identifiers.

The software is Windows compatible, making the administrative function a simple point-and-click routine. A typical administration set up screen is shown in FIG. 2, displaying all of the users on the LAN. As there shown, all of the individual users, 24, 25, 26, 27 . . . n, are displayed as user icons or figures in the "List of Users" box 23. When a specific user 27, "Admin", is clicked "on", all of the groups for the LAN are identified in the two boxes 28, 32 below the user box 23. The first group box 28, "Groups the User is In", lists only those groups to which the user has access, e.g., the "Admin" group 29 and the "Everyone" group 30. In the example, the user 27 is a generic administrative employee. Since this automatically puts him in the "Admin" group 29 he would have access to all "Admin" group parameters. However, since he is not better identified, he is also assigned to the most restrictive "Everyone" group 30. As demonstrated by the tool bar 36, users (via their icons) may be added and deleted on this screen. Further, each specific user may be assigned to or removed from a specific group by simply moving the specific group to the selected of boxes 28 and 32.

Figure 3:
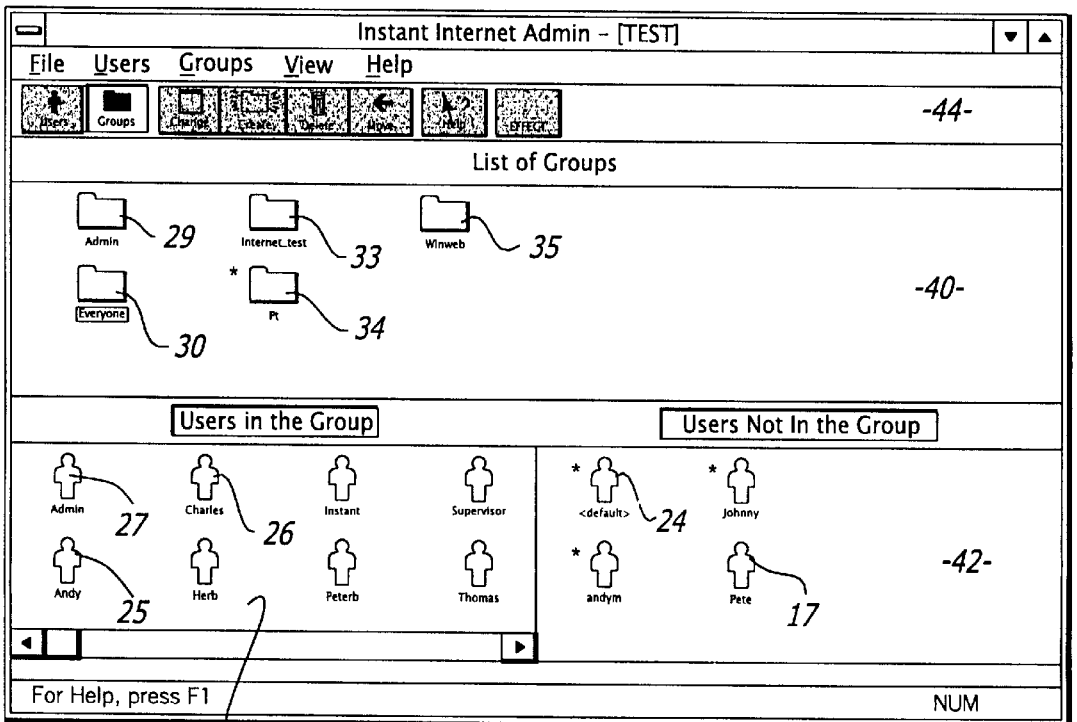
FIG. 3 is a representative screen showing the group listings.

FIG. 3 depicts the inverse of the screen in FIG. 2 and shows the administrative setup of the example with the groups as the primary criteria. All of the example group icons 29, 30, 33, 34, 35 are displayed in the "List of Groups" box or window 40. When a specific group icon such as the "Everyone" group is clicked "on", all of the user icons for the users assigned to that group are displayed in the "Users in Group" box or window 41. The icons for the users not assigned to the specific group 30 are displayed in the "Users not in Group" box or window 42. Users may be reassigned to various groups on this screen by simply moving the users into or out of window 41. As demonstrated by the tool bar 44, new groups may be added or deleted on this screen.

Figure 4:
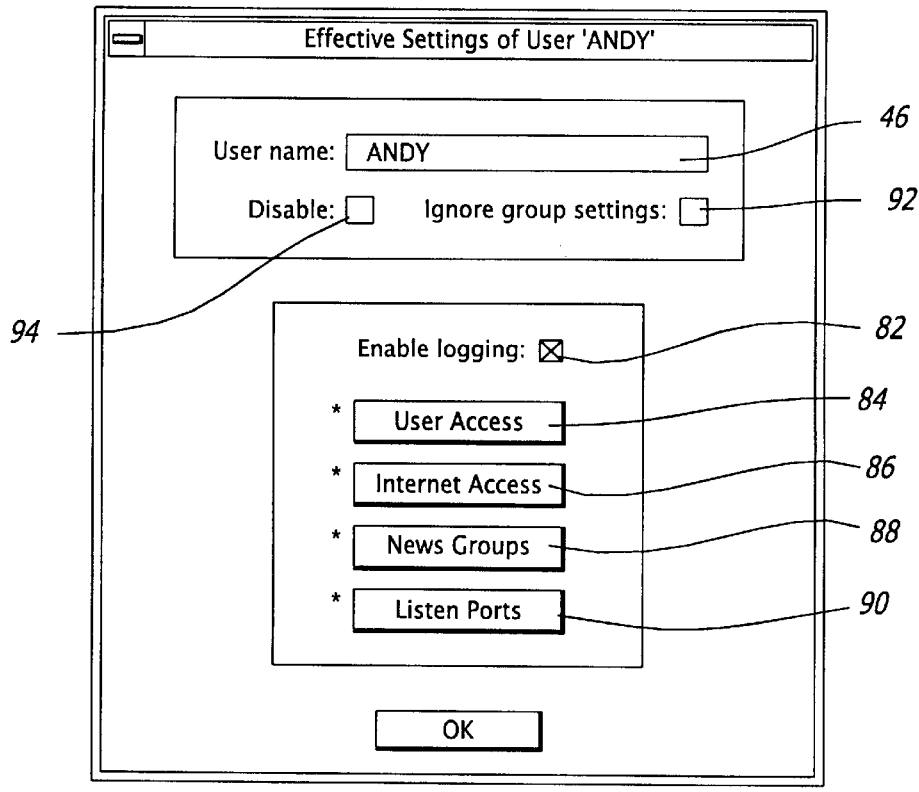
FIG. 4 is a representative screen showing a specific selected user and or group access parameters and log enable/disable.

To change the settings for a particular user ANDY, as indicated by the user icon 25, see FIGS. 2 and 3, the user icon is simply double clicked "on", bringing up the screen depicted in FIG. 4. Within window 46, the selected user's name and access parameters are displayed. The administrator uses this screen to disable a user or group (deny access)

at box 94, ignore group settings at box 92, control the logging function at box 82, change the user access by clicking "on" box 84, and change network access by clicking "on" box 86, as well as News Groups (box 88) and Listen Ports (box 90). An administrator can specify levels of access to the network for each group or user. Access control is one of the primary features of the subject invention. IP addresses, domain names and port numbers for which users can gain distributive network access are specified by the administrator, providing a wide range of control.

Using the Internet as an example, the Internet utilizes: IP Addresses, Domain Names and Port Numbers (which are services). All connections to the Internet are made using Internet Protocol (IP) Addresses. The IP Addresses allow communication over the Internet to be directed to an appropriate destination. Each IP Address consists of the actual IP address location and a Port Number. The IP Address is in the format "nnn.nnn.nnn.nnn". From one to three digits can be used between each decimal point in the address, for example 198.67.8.99:80. Domain Names are readable versions of IP address, such as "perftech.com" or "instant.net". For example, "www.perftech.com" equals "198.67.8.99". Port Numbers can be any number from 0 to 32000, with the first 1024 called "well known" Port Numbers which define specific tasks (e.g. web browsing occurs on the "well known" port number 80; file transfer protocols (FTP) use port 20 and port 21; simple mail transfer protocols (SMTP) use port 25).

Using the Internet example in conjunction with the Instant Internet access system, when access is attempted, the Instant Internet access interface 16 (see FIG. 1) checks the access list for the particular user to determine whether or not access to the address is permitted. The administration system of the subject invention sorts all access controls in the following manner:

Day of Week and Time of Day (User Access, see box 84 in FIG. 4).

Wildcard Port Numbers (*.ftp) (Internet Access, see box 86 in FIG. 4)—the example "*.ftp" means that the user can initiate the file transfer protocol to any address he has access.

Fully Specified Address (Internet Access)—the user is given the address and the specific Port Numbers to be activated at that address.

Partially Specified Address (Internet Access)—the user is given parameters limiting access to specific ports at a given address.

Figure 5:
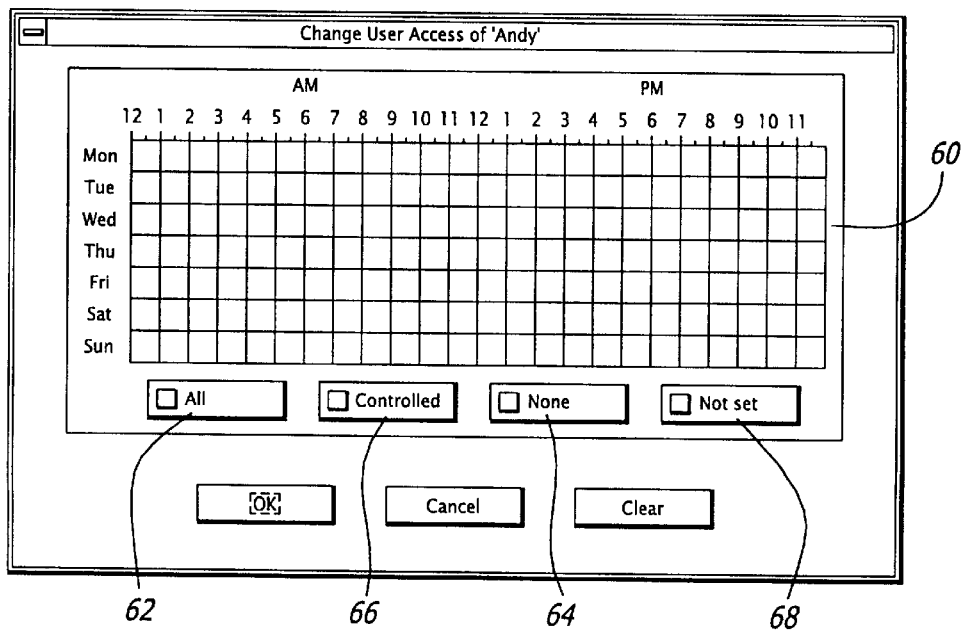
FIG. 5 is a representative screen showing time management matrix.

When the User Access option is activated by clicking "on" box 84 of the screen depicted in FIG. 4, the screen depicted in FIG. 5 is brought up. This permits the administrator to specify days of the week and times during the day when users may access the Internet. As shown in FIG. 5, once the User Access box 84 of FIG. 4 is clicked "on" the selected user's access screen is brought up. The days of the week and one hour blocks are displayed in matrix form in window 60. The administrator can then select "All" by clicking on box 62, none by clicking on box 64, or controlled by clicking on box 66. In the preferred embodiment a "Not Set" function (box 68) is also provided. This permits the administrator to combine several groups into a main group while maintaining access as identified in the original or sub-groups. When the appropriate box 62, 64, 66, 68 is clicked on, the administrator can set the specific times for the user. A color coded scheme is used in conjunction with the matrix of the preferred embodiment, with all access hours and days displayed in green, controlled access hours and days in dark blue and access hours "not set" displayed in black. For controlled access, the selected hours and days of the week are clicked on by clicking the associated matrix block. Internet access is then limited to those times and days only. Users attempting to remain connected past the permitted time are disconnected.

Figure 6:
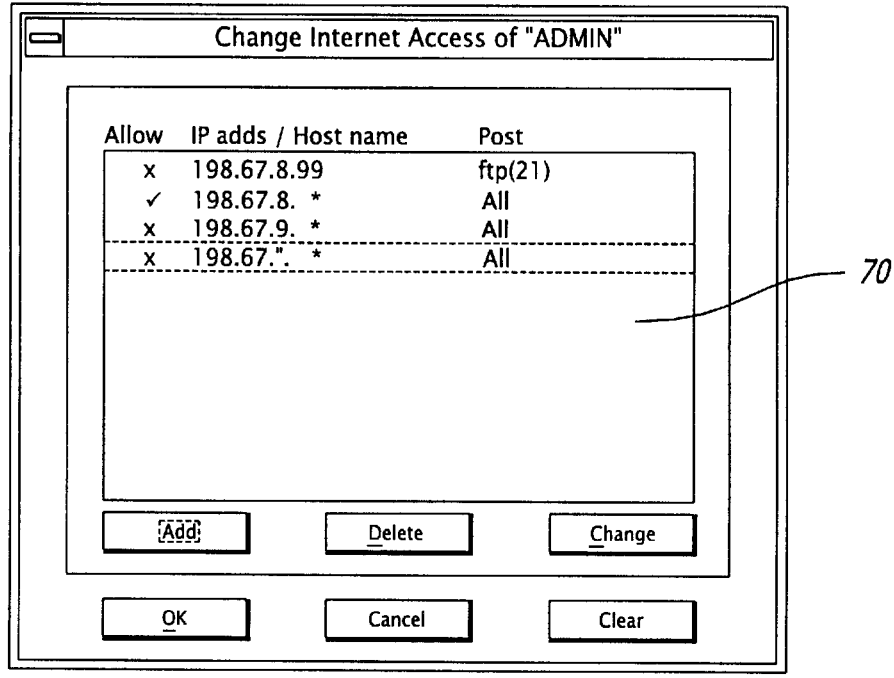
FIG. 6 is a representative screen showing a typical site management regimen.

In addition to the User Access (time and day) administration, the preferred embodiment of the invention is adapted for controlling the specific IP Addresses and Port Numbers for each user and/or user group. This is done by activating the screen depicted in FIG. 6, by clicking on the "Internet Access" box 86 of FIG. 4. In the example, access is controlled by group identity. For the group "Admin", all members of the group have access to the IP Addresses and Port Numbers displayed in window 70 of FIG. 6, and marked by the check. Those marked with "x" are not accessible. "*.*" specifies total Internet access. "www.perftech.com:*" specifies access to all Ports at this specific IP Address only. "198.*" specifies access to all Ports at all IP addresses beginning with "198". "*:80" specifies access only to Port 80 at all IP Addresses.

Figure 7:
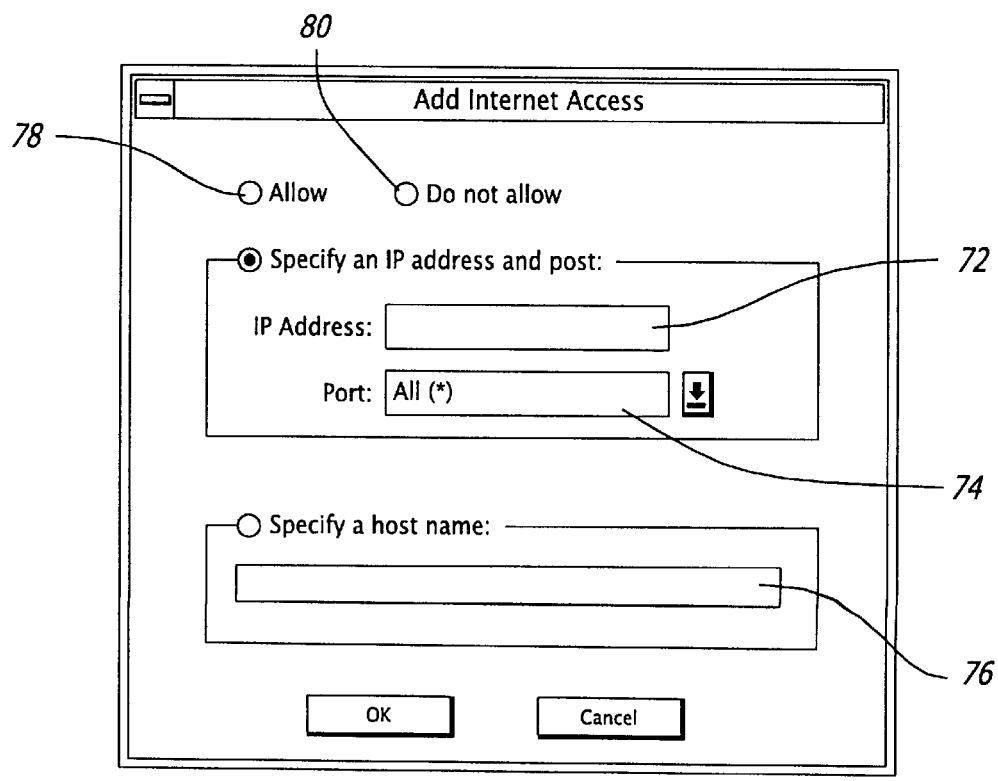
FIG. 7 is a representative host screen for adding IP addresses or port numbers to a group or user.

The window 70 can be modified by entering the appropriate changes in the window, as will now be described. The administration system of the preferred embodiment allows for the addition of IP Addresses or Port Numbers to a group or user access control list. To accomplish this, the administrator first selects the group folder by double clicking "on" the appropriate group folder icon 29, 30, 33, 34, 35 in the screen of either FIG. 2 or FIG. 3. This brings up the "Add Internet Access" screen depicted in FIG. 7. A specific address may be typed in at the "IP Address" window 72 and all or specific Port Numbers entered at the "Port" window 74. A host name may also be specified, as indicated at box 76. This address/host may be allowed or disallowed for the specific group by clicking the appropriate box 78 or 80. The administrator may also log and review a user's actual access in accordance with the preferred embodiment of the subject invention. To accomplish this, the administrator selects and clicks the "effect" button on the tool bar of FIG. 1 or 2, after a specific user icon has been selected.

This brings up the screen depicted in FIG. 4. Logging may be enabled/disabled simply by clicking the "Enable Logging" box 82. This screen also provides direct access to the various authorized addresses for the selected user, as indicated by the boxes 84, 86, 88, 90. The user may also be granted full access, by clicking the "Ignore group settings" box 92 or denied any access by clicking the "Disable" box 94. When the "Enable Logging" box 82 is activated, a complete log of the selected user's usage of the Internet is maintained.

A typical printed report is shown in FIG. 8. The date is shown in the first column 100. The time an action was taken is shown in column 102. Column 104 identifies sequence when initiated, as will be explained. Column 106 identified the user. Column 108 identifies the task. For example, as shown at entry 110, User "Herb" initiated access to the internet at 14:06:42 on Jun. 19, 1996. Herb connected to socket 2001 at 14:07:24, as shown at entry 112. Herb is the second user in sequence to initiate access on Jun. 19, 1996. Rod initiated contact as the third user at 14:07:58, see entry 114. Since Herb had continuing activity after Rod, see entry 116, he is still listed as second sequence. As shown at entry 118, Rod disconnects. When he reconnects at entry 120, this begins a new sequence 4.

The subject invention provides a comprehensive administration system for controlling access to a distributive network through a common access system by LAN or WAN users. While the English language algorithms depicted herein have been specifically described for use in a windows environment, it will be readily understood by those of ordinary skill in the art that the administration and control method described herein may be adapted for other environments without departing from the teachings of the invention. While specific features and embodiments of the invention have been described in detail herein, it will be readily understood that the invention encompasses all enhancements and modifications within the scope and spirit of the following claims.

What is claimed is:

1. A method for controlling access to a distributive network by users and user groups utilizing personal computers (PCs) on a local area network (LAN) comprising:

utilizing a server for centralized, common access by the PCs on the LAN;

establishing a database for the server to identify users and user group assignments for the LAN, the database including users and user groups native to normal LAN operation, each user group comprising one or more users;

establishing a common access distributive network interface separate from the server and communicatively coupling the LAN to the distributive network without directly connecting through the server;

programming user and user group control parameters into the database at the server, including constraints for access by users and user groups to the distributive network;

transferring the constraints to the distributive network interface; and controlling access to the distributive network for a particular user at the distributive network interface without routing the particular user's access through the server and in accordance with the constraints present in the distributive network interface for the particular user or the group to which the particular user is assigned.

2. The method of claim 1, further including defining a plurality of groups each having a unique set of parameters.

3. The method of claim 2, further including assigning a user to multiple groups.

4. The method of claim 3, wherein distributive network access by said user is limited to the parameters of the combined access restrictions of all the group memberships to which the user is assigned.

5. The method of claim 1, wherein each group is assigned a time parameter for defining specific time blocks during which the user may gain access to the distributive network via the central, common access distributive network interface.

6. The method of claim 5, further including disconnecting users attempting to remain connected outside the specific time blocks.

7. The method of claim 1, wherein the parameters include specific distributive network destinations and services to which the user may gain access on the distributive network via the central, common access distributive network interface.

8. The method of claim 7, wherein each distributive network destination and service is an address defined by an address locator and a port number, and wherein each group includes an address parameter to which is assigned a combination of specified address locators and specified port numbers.

9. The method of claim 8, wherein the address parameter includes all address locators with specific port numbers.

10. The method of claim 8, wherein the address parameter includes all specific address locators with all port numbers.

11. The method of claim 1, including logging of actual user access to the distributive network.

12. The method of claim 11, wherein the logging further includes maintaining a log of the time blocks when accessed and the distributive network locators accessed.

13. The method of claim 12, wherein the logging further includes maintaining a log of the port numbers accessed.

14. The method of claim 12, wherein the logging further includes the reverse name lookup of each IP address to display in the log the name of the accessed domain rather than only the numeric IP address.

15. A storage medium having therein a plurality of programming instructions which, when executed by a processor, implement a service for controlling access of users on a local area network (LAN) to a distributive network, the service including a function for:

accessing a database of a server for centralized, common access by personal computers (PCs) on the LAN to identify users and user group assignments native to the normal LAN operation, each user group comprising one or more users;

assigning user and user group control parameters into the database at the server, including constraints for access by users and user groups to the distributive network;

transferring the constraints to a distributed network interface which is separate from the server, the distributed network interface providing a communicative coupling of the LAN to the distributive network without directly connecting through the server; and controlling access to the distributive network for a particular user at the distributive network interface without routing the particular user's access through the server and in accordance with the constraints present in the distributive network interface for the particular user or the group to which the particular user is assigned.

16. The storage medium of claim 15, wherein the function is further for defining a plurality of groups each having a unique set of parameters.

17. The storage medium of claim 15, wherein each group is assigned a time parameter for defining specific time blocks during which the user may gain access to the distributive network.

18. The storage medium of claim 17, wherein the function is further for disconnecting users attempting to remain connected outside the specific time blocks.

19. The storage medium of claim 15, wherein the parameters include specific distributive network sites to which the user may gain access on the distributive network.

20. The storage medium of claim 19, wherein each distributive network destination or service is an address defined by an address locator and a port number, and wherein each group includes an address parameter to which is assigned a combination of specified address locators and specified port numbers.

21. The storage medium of claim 15, wherein each distributive network access to a newsgroup is defined by the hierarchical newsgroup name and access constraints are forged by floating text strings for allow or disallow of access.

22. The storage medium of claim 15, wherein the function is further for logging of actual user access to the distributive network.

23. The storage medium of claim 22, wherein the logging further includes maintaining a log of the time blocks when accessed and the distributive network locators accessed.

24. The storage medium of claim 22, wherein the logging further includes maintaining a log of the port numbers accessed.

25. An apparatus comprising:

a storage medium having stored therein a plurality of programming instructions; and an execution unit, coupled to the storage medium, to execute the programming instructions to, access a database of a server for centralized, common access by personal computers (PCs) on a local area network (LAN) to identify users and user group assignments native to the normal LAN operation, each user group comprising one or more users, assign user and user group control parameters into the database at the server, including constraints for access by users and user groups to a distributive network, transfer the constraints to a distributed network interface which is separate from the server, the distributed network interface providing a communicative coupling of the LAN to the distributive network without directly connecting through the server, control access to the distributive network for a particular user at the distributive network interface without routing the particular user's access through the server and in accordance with the constraints present in the distributive network interface for the particular user or the group to which the particular user is assigned.

26. The apparatus of claim 25, wherein each group is assigned a time parameter for defining specific time blocks during which the user may gain access.

27. The apparatus of claim 25, wherein the parameters include specific Internet addresses and ports to which the user may gain access.

28. The apparatus of claim 25, wherein the execution unit is further to execute the programming instructions to maintain a log of actual user access to the Internet.

29. The apparatus of claim 28, wherein the execution unit is further to execute the programming instructions to include a log of the time blocks when accessed and the distributive network locators accessed.

* * * * *